(12) United States Patent
Starr et al.

(10) Patent No.: US 9,472,109 B2
(45) Date of Patent: Oct. 18, 2016

(54) OBSTACLE DETECTION SYSTEM PROVIDING CONTEXT AWARENESS

(71) Applicant: Honeywell International Inc., Morristown, NJ (US)

(72) Inventors: Jeffrey W. Starr, Albuquerque, NM (US); Andrew F. Lamkin, Albuquerque, NM (US); Duke Buster, Albuquerque, NM (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/149,482

(22) Filed: Jan. 7, 2014

(65) Prior Publication Data

US 2015/0194059 A1    Jul. 9, 2015

(51) Int. Cl.
| | |
|---|---|
| *G08G 5/04* | (2006.01) |
| *G08G 5/00* | (2006.01) |
| *G08G 5/06* | (2006.01) |
| *G06F 3/0484* | (2013.01) |
| *G01S 13/93* | (2006.01) |

(52) U.S. Cl.
CPC ............. *G08G 5/04* (2013.01); *G06F 3/0484* (2013.01); *G08G 5/0017* (2013.01); *G08G 5/0073* (2013.01); *G08G 5/065* (2013.01); *G01S 2013/9335* (2013.01)

(58) Field of Classification Search
CPC ...................... G01S 13/931; G01S 2013/9335; G01S 13/94; G01S 13/93; G01S 13/9303; G08G 5/00; G08G 5/0004; G08G 5/0017; G08G 5/0021; G08G 5/0043; G08G 5/0047; G08G 5/06; G08G 5/065

USPC .............................................. 701/3, 300–302
See application file for complete search history.

(56) References Cited

U.S. PATENT DOCUMENTS

| | | | |
|---|---|---|---|
| 5,381,338 A | | 1/1995 | Wysocki et al. |
| 5,448,243 A | * | 9/1995 | Bethke et al. .................. 342/59 |
| 5,983,161 A | * | 11/1999 | Lemelson et al. ............ 701/301 |

(Continued)

FOREIGN PATENT DOCUMENTS

| | | |
|---|---|---|
| EP | 1787142 B1 | 11/2008 |
| EP | 2530486 A2 | 12/2012 |

(Continued)

OTHER PUBLICATIONS

Kamineni et al., "Electronic Moving Map of Airport Surface on Electronic Flight Bag," IEEE, Digital Avionics Systems Conference, Oct. 24-28, 2004, vol. 1, 9 pp.

(Continued)

*Primary Examiner* — Thomas Tarcza
*Assistant Examiner* — Tyler J Lee
(74) *Attorney, Agent, or Firm* — Shumaker & Sieffert, P.A.

(57) ABSTRACT

In sonic examples, an obstacle detection system is configured to generate and display a graphical user interface (GUI) that includes an overhead image of an area in which a vehicle is positioned, a graphical representation of the vehicle, and graphical representations of one or more obstacles, The graphical representations of the one or more obstacles and vehicle can be arranged relative to the overhead image to indicate determined real-world positions of the one or more obstacles and vehicle, respectively, relative to other features shown in the overhead (e.g., airport structure or other buildings).

20 Claims, 5 Drawing Sheets

(56) References Cited

U.S. PATENT DOCUMENTS

| | | | |
|---|---|---|---|
| 6,118,401 A | 9/2000 | Tognazzini | |
| 6,246,320 B1* | 6/2001 | Monroe | 340/506 |
| 6,895,332 B2 | 5/2005 | King et al. | |
| 7,379,165 B2* | 5/2008 | Anderson et al. | 356/5.05 |
| 7,463,183 B2 | 12/2008 | Reich | |
| 7,561,037 B1 | 7/2009 | Monroe | |
| 7,579,980 B2 | 8/2009 | Anderson et al. | |
| 7,839,322 B2 | 11/2010 | Filias et al. | |
| 7,903,023 B2* | 3/2011 | Cornic et al. | 342/139 |
| 7,932,838 B2* | 4/2011 | Hamza et al. | 340/958 |
| 7,986,249 B2* | 7/2011 | Wilson | G01C 23/00 340/951 |
| 8,019,529 B1 | 9/2011 | Sharma et al. | |
| 8,121,786 B2 | 2/2012 | Morbey et al. | |
| 8,249,762 B1 | 8/2012 | Flotte et al. | |
| 8,271,186 B2* | 9/2012 | Nouvel | G01C 23/00 701/10 |
| 8,378,852 B2 | 2/2013 | Naimer et al. | |
| 8,629,800 B2 | 1/2014 | Anderson et al. | |
| 8,754,786 B2* | 6/2014 | Burns | G01C 23/00 340/971 |
| 8,917,191 B1* | 12/2014 | Tiana | G01C 23/00 340/945 |
| 8,976,042 B1* | 3/2015 | Chiew | G08G 5/0021 340/945 |
| 2001/0037166 A1* | 11/2001 | Block | G08G 5/0021 701/14 |
| 2002/0109625 A1* | 8/2002 | Gouvary | 342/29 |
| 2003/0067542 A1 | 4/2003 | Monroe | |
| 2004/0225420 A1* | 11/2004 | Morizet | G01C 23/005 701/3 |
| 2005/0007257 A1 | 1/2005 | Rast | |
| 2006/0066459 A1* | 3/2006 | Burch | G01C 23/005 340/980 |
| 2006/0066470 A1* | 3/2006 | Anderson et al. | 342/29 |
| 2006/0119472 A1* | 6/2006 | Tsuboi | B60Q 9/005 340/435 |
| 2007/0002138 A1* | 1/2007 | Oldroyd | G06T 17/05 348/143 |
| 2008/0062011 A1 | 3/2008 | Butler et al. | |
| 2008/0103641 A1 | 5/2008 | Ratcliffe | |
| 2008/0172178 A1 | 7/2008 | Anderson et al. | |
| 2008/0180310 A1 | 7/2008 | Reich | |
| 2008/0198041 A1 | 8/2008 | Sallier et al. | |
| 2008/0306691 A1 | 12/2008 | Louis et al. | |
| 2009/0033552 A1 | 2/2009 | Kirmuss et al. | |
| 2009/0164122 A1 | 6/2009 | Morbey et al. | |
| 2009/0174591 A1 | 7/2009 | Cornic et al. | |
| 2009/0295622 A1 | 12/2009 | Anderson et al. | |
| 2009/0323046 A1 | 12/2009 | Tan et al. | |
| 2010/0060511 A1* | 3/2010 | Nouvel | G01C 23/00 342/29 |
| 2010/0123599 A1 | 5/2010 | Hamza et al. | |
| 2010/0219988 A1 | 9/2010 | Griffith | |
| 2011/0015816 A1 | 1/2011 | Dow et al. | |
| 2011/0187563 A1* | 8/2011 | Sanders-Reed | G06F 3/14 340/971 |
| 2011/0216059 A1* | 9/2011 | Espiritu | G06T 19/00 345/419 |
| 2011/0224845 A1 | 9/2011 | Perry et al. | |
| 2012/0092208 A1 | 4/2012 | LeMire et al. | |
| 2012/0130624 A1 | 5/2012 | Clark et al. | |
| 2012/0200433 A1 | 8/2012 | Glover et al. | |
| 2013/0002454 A1* | 1/2013 | Burns | G01C 23/00 340/975 |
| 2013/0096814 A1 | 4/2013 | Louis et al. | |
| 2013/0120164 A1 | 5/2013 | Greene et al. | |
| 2013/0127642 A1* | 5/2013 | Maggiore et al. | 340/947 |
| 2013/0321169 A1 | 12/2013 | Bateman et al. | |
| 2013/0321176 A1* | 12/2013 | Vasek | G08G 5/04 340/945 |
| 2013/0321192 A1 | 12/2013 | Starr et al. | |
| 2013/0325245 A1 | 12/2013 | Kolcarek et al. | |
| 2013/0345906 A1 | 12/2013 | Kabrt et al. | |
| 2014/0062756 A1 | 3/2014 | Lamkin et al. | |

FOREIGN PATENT DOCUMENTS

| | | |
|---|---|---|
| EP | 2530486 A3 | 1/2013 |
| FR | 2932279 A1 | 12/2009 |
| JP | 2011028579 A | 2/2011 |
| WO | 2006027762 A1 | 3/2006 |
| WO | 2013181334 A1 | 12/2013 |

OTHER PUBLICATIONS

Abstract of "Pilots view airport charts," Engineering Village, May 2005, retrieved from www.engineeringvillage.com on Jun. 21, 2013, 1 pp.

U.S. Appl. No. 13/835,122, by Andrew F. Lamkin et al., filed Mar. 15, 2013.

Dubois, "Eurocopter Researches Low-Cost Obstacle Warning," Aviation International News, retrieved from internet http://www.ainonline.com/aviation-news/aviation-international-news/2012-05-02/eurocopter-researches-low-cost-obstacle-warning, May 2, 2012, 3 pp.

Yamawaki et al., "60-GHz Millimeter-Wave Automotive Radar," Fujitsu Ten Tech., No. 11, 1998, 12 pp.

Extended Search Report from counterpart European Application No. 15150188.9, dated May 22, 2015, 5 pp.

Response to the Communication pursuant to Rules 70(2) and 70a(2) EPC, dated Jul. 13, 2015, from counterpart European Application No. 15150188.9, filed Jan. 6, 2016, 16 pp.

Examination Report from counterpart European Application No. 15150188.9, dated Mar. 14, 2016, 5 pp.

Prinzel, L.J. et al., "Synthetic Vision Systems," Jan. 1, 2009, retrieved from http://ntrs.nasa.gov/archive/nasa/casi.ntrs.nasa.gov/20090007635.pdf, 14 pp.

Response to the Communication pursuant to Article 94(3) EPC, dated Mar. 14, 2016, from counterpart European Application No. 15150188.9, filed Jul. 11, 2016, 31 pp.

* cited by examiner

OBSTACLE DETECTION SYSTEM PROVIDING CONTEXT AWARENESS

TECHNICAL FIELD

The disclosure relates to aircraft collision avoidance.

BACKGROUND

One or more crew members maneuvering a relatively large vehicle, such as an aircraft, may have difficulty in being aware of obstacles around the vehicle with which the vehicle may potentially collide. The difficulty can arise, in part, due to limited visibility caused by the relatively large size of the vehicle, and due to potential distractions, such as other moving vehicles, or such as other maneuvers and related operations being performed by the crew, Examples of obstacles include, but are not limited to, static obstacles (e.g., a hangar or other building, a lighting pole or a fence) and other vehicles (e.g., a ground vehicle, or an aircraft).

Some aircraft, ground systems, or both, are equipped with an obstacle detection system used during ground operations of an aircraft to help a flight crew, ground crew, or both stay apprised of obstacles with which the aircraft may collide, The obstacle detection system may, for example, be configured to detect an obstacle and generate and display a graphical user interface that provides an indication of the detected obstacle.

SUMMARY

The disclosure describes example obstacle detection systems configured to generate and display a graphical user interface (GUI) that includes an overhead image (e.g., a satellite image) of an area in which a vehicle (e.g., an aircraft or a marine vehicle) is positioned (e.g., a ground area or a water area), a graphical representation of the vehicle, and graphical representations of one or more obstacles, The graphical representations of the one or more obstacles and vehicle can be arranged relative to the overhead image to indicate determined real-world positions (e.g., geographical location and orientation) of the one or more obstacles and vehicle, respectively, relative to other features shown in the overhead (e.g., airport structure or other buildings). The disclosure also describes example methods for generating and displaying the GUI including the information regarding detected ground obstacles.

Displaying the graphical representations of the vehicle and one or more detected obstacles together with the overhead image may help provide a user with context awareness for the current vehicle position relative to obstacles, which may help a user make more informed decisions about how to maneuver the vehicle relative to the obstacles. In some examples, the GUI also includes a graphical representation of a user, which may provide further context awareness for the user. The graphical representation of the user can be arranged relative to the overhead image to indicate determined real-world position of the user In some examples, the overhead image is a stored image that does not necessarily provide a real-time indication of the obstacles that surround the vehicle. In other examples, the overhead image is a real-time image that illustrates the current surroundings of the vehicle, including obstacles located proximate the vehicle at the time the system presents the GUI to the user. In these examples, the overhead image may also include images of the vehicle and one or more obstacles. In either example, graphical representations of the vehicle and one or more obstacles may be provided in the GUI to convey additional information to the user, such as the threat level of the obstacles. The graphical representations of the obstacles may, for example, include one or more characteristics e.g., visual indicia) that indicate the threat level of the obstacles, which may be a function of the proximity of the obstacles to the vehicle.

In one example, the disclosure is directed to a method comprising determining, by a processor, a location of at least one obstacle proximate an aircraft, determining, by the processor, a location of the aircraft, and generating, by the processor, a graphical user interface based on the location of the obstacle and the location of the aircraft, the graphical user interface comprising a graphical representation of the aircraft and a graphical representation of the at least one obstacle on an overhead image of area in which the aircraft and the at least one obstacle are positioned.

In another example, the disclosure is directed to a system comprising a display and a processor configured to determine a location of at least one obstacle proximate an aircraft, determine a location of the aircraft, generate a graphical user interface based on the location of the obstacle and the location of the aircraft, and display the graphical user interface via the display, the graphical user interface comprising a graphical representation of the aircraft and a graphical representation of the at least one obstacle on an overhead image of area in which the aircraft and the at least one obstacle are positioned.

In another example, the disclosure is directed to a system comprising means for determining a location of at least one obstacle proximate an aircraft, means for determining a location of the aircraft, means for receiving an overhead image of area in which the aircraft and the at least one obstacle are positioned, and means for generating a graphical user interface based on the location of the obstacle and the location of the aircraft, the graphical user interface comprising a graphical representation of the aircraft and a graphical representation of the at least one obstacle on the overhead image.

In another example, the disclosure is directed to a computer-readable medium comprising instructions that, when executed by a processor, cause the processor to determine a location of at least one obstacle proximate an aircraft, determine a location of the aircraft, generate a graphical user interface based on the location of the obstacle and the location of the aircraft, and display the graphical user interface via the display, the graphical user interface comprising a graphical representation of the aircraft and a graphical representation of the at least one obstacle on an overhead image of area in which the aircraft and the at least one obstacle are positioned.

In another aspect, the disclosure is directed to an article of manufacture comprising a computer-readable storage medium. The computer-readable storage medium comprises computer-readable instructions for execution by a processor. The instructions cause a programmable processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory that stores instructions (e.g., in the form of a computer program or other executable) to cause a programmable processor to perform the techniques described herein. The computer-readable medium is non-transitory in sonic examples.

The details of one or more examples are set forth in the accompanying drawings and the description below. Other features, objects, and advantages of the disclosure will be apparent from the description and drawings, and from the claims.

DETAILED DESCRIPTION

An obstacle detection system can be used to help a user stay apprised of obstacles proximate a vehicle, For example, the system can be used during ground operations to help an aircraft flight crew or ground crew stay apprised of obstacles with which the aircraft may collide during the ground operations (e.g., during taxiing by the aircraft or towing of the aircraft via a tow tug to a destination, such as a hangar or a gate area of an airport). The obstacles can include, for example, another aircraft, a ground vehicle, an airport structure, or another object. In some cases, an aircraft may be moved on the ground to a particular position with the support of other vehicles (e.g., ground vehicles, such as tow tugs) and the ground crew may include a driver of the other vehicle.

In some examples described herein, an obstacle detection system includes one or more sources of information regarding the presence of an obstacle proximate an aircraft (e.g., sensors placed at various locations around the aircraft, such as at the wingtips), a user interface, and a processor configured to receive the information, detect an obstacle based on the information, and control the user interface to present a GUI that includes information regarding the detected obstacle. The user interface is configured to present the GUI to a user, which may be a ground crew member, a flight crew member, or another user. The user interface can include any suitable human-machine interface, such as a handheld computing device (e.g., a tablet computing device), a head-up display, a head-down display, or a head-mounted display.

An aircraft flight crew maneuvering an aircraft on the ground, e.g., as an aircraft taxis from a runway to a gate at an airport, or a ground crew directing the movement of the aircraft on the ground may have difficulty being aware of obstacles proximate the aircraft. The difficulty may arise in part due to limited visibility caused by the relatively large size of the aircraft, and due to potential distractions, such as other moving vehicles on the ground, or such as other taxiway maneuvers and related operations being performed by the aircraft crew. For example, due to the size of the aircraft, the crew may be unaware of obstacles near the wingtips or the tail of the aircraft. The obstacle detection systems described herein may help reduce the number, severity, or both, of inadvertent collisions of the aircraft with obstacles while the aircraft is on the ground by helping the flight crew, ground crew, or both (generally referred to herein as "crew") stay apprised of obstacles that may be near the aircraft.

The devices, systems, and techniques described herein include features that help enhance a user's awareness of the obstacles proximate an aircraft by providing context awareness regarding the task at hand. In some examples described herein, an obstacle detection system is configured to generate and display a GUI that includes an overhead image (e.g., a satellite image) of the area in which a vehicle (e.g., an aircraft or marine vehicle) is positioned, a graphical representation of the vehicle, and graphical representations of one or more obstacles. The graphical representations of the vehicle and one or more obstacles are presented with the overhead image to indicate the current position (e.g., geographical location and orientation) of the vehicle and obstacles, respectively, relative to other features shown in the overhead, In some examples, the GUI also includes a graphical representation of a user, which may provide further context awareness for the user.

The graphical representations of the vehicle and one or more obstacles are positioned relative to the overhead image to indicate determined real-world positions of the vehicle and obstacles relative to other features (e.g., airport structure or other buildings). In this way, the GUI may provide context awareness for the user, by presenting a "big-picture" visual representation of the aircraft and surrounding obstacles. By providing real-world context for the current position of the vehicle and one or more obstacles, and, in some examples, the user, the GUI may help improve user awareness of obstacles, which may help the user make more informed decisions about directing the movement of the aircraft on the surface in order to avoid collisions with the obstacles.

The overhead image of the area in which a vehicle is positioned can be, for example, a surface on which an aircraft is positioned or a water area in which a boat is positioned. The overhead image can be a static image (e.g., a photograph) or a video image captured by a camera or another optical device, and is a snapshot of the real-world environment in which the aircraft is positioned. For example, the overhead image can be an image captured by a satellite or another overhead camera (e.g., on a mechanical system, or on a manned or unmanned aerial vehicle) configured to capture a plan view of the area in which the aircraft is positioned. In contrast to graphical representations (e.g., schematic drawings) of the area in which a vehicle is positioned, the overhead image can provide a user with a more accurate and easily understandable framework for determining the current position of the vehicle and obstacles.

In some examples, the overhead image is a stored image that does not necessarily provide a real-time view of the area in which the vehicle is positioned. Thus, in some examples, the overhead image may not include an image of the vehicle and one or more detected obstacles. In other examples, the overhead image is a real-time image that includes an image of the vehicle and obstacles located proximate the vehicle at the time the system presents the GUI to the user. In either example, the GUI can include graphical representations of the vehicle and one or more obstacles, which are objects that are not part of the image, but, rather, imposed over image (or otherwise displayed with the image). For example, the graphical representations of the vehicle and one or more obstacles can be computer-generated graphical objects.

The graphical representations of the vehicle and one or more obstacles may be provided to convey additional information to the user, such as the threat level of the obstacles. The graphical representations of the obstacles may, for example, include one or more characteristics (e.g., visual indicia) that indicate the threat level of the obstacles, which may be a function of the proximity of the obstacles to the vehicle, a function of the possibility the aircraft will collide with the detected obstacle, or both. The ground obstacle detection system can determine the threat level based on the proximity of the detected obstacle to the aircraft, based on the location of the detected obstacle relative to the aircraft, based on the heading of the aircraft, based on the speed of the aircraft, or any combination thereof.

For example, the GUI can display a detected obstacle such that the relative distance between the detected obstacle and the aircraft is discernible by a user from viewing the GUI. As an example, the graphical representation of the detected obstacle displayed via the GUI can include one or more characteristics that indicate a relative distance between the detected obstacle and the aircraft. Examples of characteristics include visible indicia such as, but not limited to, a color, shading of a displayed object, a line pattern used to define or fill the displayed object, and the like. As another example, the GUI can include a ruler or other tool from which a user may relatively quickly gauge the approximate distance between the aircraft and the detected obstacle.

In some examples, the obstacle detection system described herein may be used in conjunction with a ground obstacle collision alert system, which is configured to generate and deliver, via a user interface, a ground obstacle collision alert indicative of a ground obstacle collision condition, which can include, for example, a condition in which there is a potential for a collision between the aircraft and an obstacle while the aircraft is on the ground, e.g., due to the distance between the aircraft and the obstacle, due to the velocity and direction of the aircraft relative to the obstacle, or any combination thereof. The ground obstacle collision alert may be audible, visual, somatosensory, or any combination thereof.

While examples of obstacle detection systems are primarily described herein with reference to aircraft, in other examples, the devices, systems, and techniques for collision avoidance may also be used with other vehicles on the ground or other surfaces, such as with marine vehicles in the water. In the case of a marine vehicle, a towing boat may be used to maneuver a relatively large ship in the water to a docking location. It may be useful for crew aboard the tow boat or the ship to stay apprised of obstacles and the location of the obstacles relative to the water or ground surrounding the ship.

Figure 1:
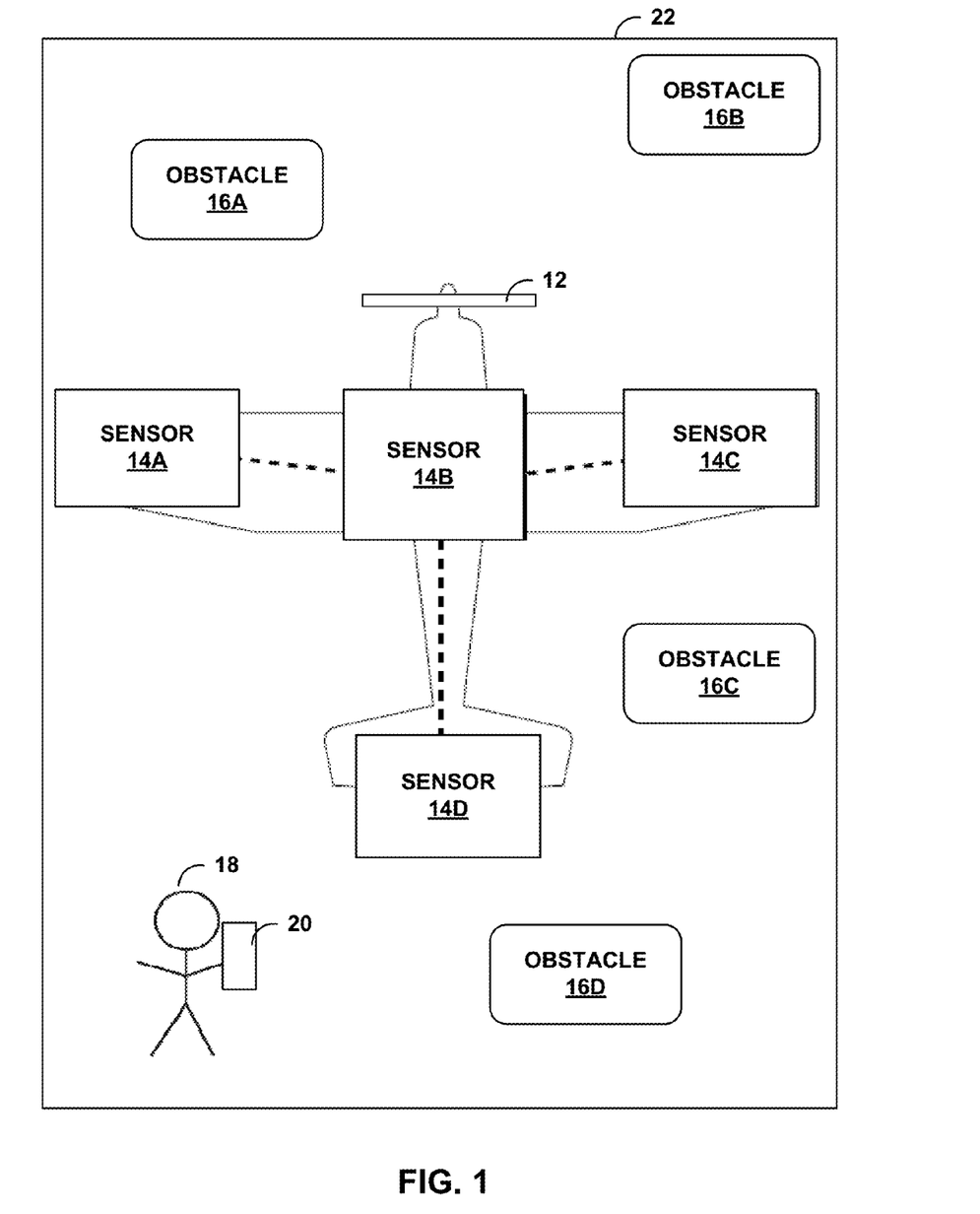
FIG. 1 is a schematic diagram of an obstacle detection system, an aircraft, a plurality of obstacles, and a user (e.g., a ground crew member).

FIG. 1 is a schematic diagram illustrating an example obstacle detection system, as well as an overhead view of an example situation in which context awareness may be useful. In the example illustrated in FIG. 1, aircraft includes sensors 14A, 14B, 14C, and 14D (collectively referred to as "sensors 14"). As illustrated, aircraft 12 is surrounded by a plurality of obstacles 16A, 16B, 16C, and 16D (collectively referred to as "obstacles 16"). In addition, FIG. 1 illustrates user 18, who may be a ground crew member, using device 20, which may be configured to display a GUI including a graphical representation of aircraft 12 and one or more of obstacles 16A-16D on an overhead image of surface 22, upon which aircraft 12 and the one or more obstacles 16A-16D are positioned. In some examples, device 20 is configured to generate the GUI, while in other examples, another device remotely located from device 20 generates the GUI. Sensors 14 and device 20 are a part of the example obstacle detection system shown in FIG. 1.

Sensors 14 are each configured to generate sensor data indicative of a position of a portion of aircraft 12 and/or a position of one or more obstacles, e.g., obstacles 16. Although FIG. 1 illustrates four sensors 14, aircraft 12 may include any suitable number of sensors 14. In some examples, a particular sensor 14 may generate position data representative of the position of the respective portion of aircraft 12 on which the particular sensor 14 is positioned. For example, sensor 14A may generate sensor data representative of the position of the left wingtip of aircraft 12.

One or more of sensors 14 are configured to generate data indicative of a position of a portion of aircraft 12 may be any suitable sensor type. For example, sensors 14 may include Global Positioning System (GPS) sensors, inertial navigation system (INS), or another positioning system configured to indicate the location of aircraft 12. The location of aircraft 12 indicated by the data from one or more data sources 18 may be the geographic location (e.g., latitude and longitude) of aircraft 12, the location of aircraft 12 relative to one or more landmarks, or any combination thereof.

One or more of sensors 14A-14D may also be configured to generate sensor data indicative of a position of one or more of obstacles 16A-16D. Sensors 14 may include any type of sensor suitable for generating such data. For example, the sensors may be a part of a synthetic vision system/enhanced vision system/combined vision system (SVS/EVS/CVS) of aircraft 12. Sensors of data sources 18 configured to generate information about obstacles near aircraft 12 can include one or more active sensors (e.g., one or more radar sensors), one or more passive sensors e.g., one or more cameras), or any combination thereof. The sensors may be located at any suitable place on aircraft 12. For example, in some examples, if the sensors include radar sensors or cameras, the radar sensors or cameras can be located on tips of the wings of aircraft 12 and oriented along a horizontal plane to detect the presence of objects at the same height of the wings. In addition, the sensors may be oriented in any suitable direction for detecting ground obstacles.

The fields of view (FOVs) of the sensors 14 used to detect obstacles can be selected such that sensors help provide a user stay apprised of obstacles proximate aircraft 12, such as near the wings and tail of aircraft 12.

In some examples, the one or more sensors 14 used to detect obstacles include one or more radar sensors, which are each configured to generate and emit a radar pulse and detect a radar return pulse. The radar return pulse is generated by reflected energy from an object upon which the emitted radar pulse is incident on, where the object can be obstacles (e.g., ground objects) in an area of interest about aircraft 12. The radar sensor can include an antenna (e.g., a stationary antenna or an antenna that may be moved to sweep an area of interest) configured to receive the radar return pulses. A processor of the obstacle detection system (e.g., processor 24 of device 20, shown in FIG. 2) can be configured to detect obstacles and determine the location (e.g., global coordinates or location relative to aircraft 12) of obstacles based on the radar return pulses. The location can be, for example, both a distance and angular location relative to aircraft 12. The one or more radar sensors can include, for example, any suitable radar sensors, such as, but not limited to, radar sensors used in a weather radar system of aircraft 12 or radar sensors dedicated to detecting ground obstacles near aircraft 12.

For example, sensors 14 may include one or more radar sensor modules, such as those described in U.S. patent application Ser. No. 13/835,122 by Lamkin et al., entitled "COLLISION-AVOIDANCE SYSTEM FOR GROUND CREW USING SENSORS," which is incorporated herein by reference in its entirety. Each radar sensor module is configured to emit, via the respective radar emitter, radar signals, receive, at the respective detector device, radar return signals corresponding to reflections of the emitted signal from a ground obstacle, and transmit radar information associated with the received radar signal reflections reflected from the ground obstacle. Each of the plurality of radar sensor modules can be uniquely located on a surface of aircraft 12 that is at risk for collision with a ground obstacle if the aircraft is moving (e.g., on wing tips, tail, vertical stabilizer, cowlings of the aircraft engines, or any combination thereof). A processor of the obstacle detection system can receive the radar return signals from the radar sensor modules, identify locations of ground obstacles in proximity to aircraft 12 based on the radar return signals (e.g., within a predetermined distance threshold of aircraft 12). As described in further detail below, the processor can generate a GUI that includes an overhead view of surface 22, as well as a graphical representation of aircraft 12 and a graphical representation of obstacles 16 positioned relative to the overhead view to indicate the real world position of aircraft 12 and obstacles 16.

In some examples, the one or more sensors 14 used to detect obstacles include one or more cameras. A processor of the obstacle detection system may be configured to receive images captured by the one or more cameras and process the images based on light emitted by a light on aircraft 12, by light emitted by other lamps or emitted from other lighting fixtures, or from ambient light to detect obstacles 16 and, in sonic examples, determine the location of detected obstacles 16 by at least identifying ranges from ground obstacles that aircraft 12 may potentially collide with.

In addition to, or instead of, the techniques described above, a processor of the obstacle detection system can be configured to implement one or more ground obstacle detection techniques described in commonly-assigned U.S. patent application Ser. No. 13/710,400 by Bateman et al., which is entitled, "AIRPORT SURFACE COLLISION-AVOIDANCE SYSTEM (ASCAS)" and was filed on Dec. 10, 2012, the entire content of which is incorporated herein by reference. In addition, aircraft 12 may include any devices and systems described in U.S. patent application Ser. No. 13/710,400 by Bateman et al.

U.S. patent application Ser. No. 13/710,400 by Bateman et al. discloses an airport surface collision-avoidance system (ASCAS) that includes a plurality of sensors (e.g., one or more active sensors, such as radar, one or more passive sensors, such as a camera, or both) within aircraft light modules. Based on information from these sensors, a processor (e.g., processor 24 of FIG. 2) may detect and track obstacles, evaluate and. prioritize threats, and declare and determine collision-avoidance actions. The ASCAS is configured to help avoid collisions on the airport surface (e.g., during taxiing clear of airport buildings, during taxiing close to airport buildings, during gate operations), between aircraft 12 and any type of obstacle (e.g., another aircraft, airport building, and ground service equipment), during all visibility conditions, for any type of collision (e.g., a collision with an object and an aircraft wingtip, tail assembly, engine cowl, fuselage, door, or any combination thereof), and while aircraft 12 is under its own power or receives power from an external device.

The data generated by sensors 14 may be used by a processor (e.g., processor 24 of FIGS. 2 and 4) to detect obstacles 16 and generate a GUI including a graphical representation of aircraft 12 and one or more of obstacles 16. In some examples, the processor may be positioned within an external device, such as device 20 illustrated in FIG. 1. In other examples, the processor may be positioned elsewhere, such as in a remote computer.

In some examples, the processor can also use other data to detect obstacles, such as data received from sources external to aircraft 12. Examples of data that can be received from sources external to aircraft 12 include, but are not limited to, data indicating the position and, in some cases, the velocity, of other aircraft on the ground, such as automatic dependent surveillance-broadcast or broadcast/traffic information service-broadcast (ADS-B/TIS-B) data received from other aircraft or ground vehicles, data transmitted by an airport or airline and indicating the position of other vehicles/aircraft/obstacles (e.g., received by aircraft 12 via a Worldwide Interoperability for Microwave Access (WiMAX)), or any combination thereof. ADS-B data can provide information regarding not only the relative location of another aircraft, but also aircraft type data. In some examples, a memory of the obstacle detection system (e.g., memory 25 shown in FIG. 2) stores a database that provides geometry for different types of aircraft. Thus, in some examples, based on ADS-B data received by the processor, the processor can determine the size of a detected obstacle relative to aircraft 12.

In some examples, a collision avoidance system may also include a sensor 14 indicative of the position of user 18, For example, device 20 may include a sensor 14 configured to generate sensor data indicative of the position of user 18. As another example, user 18 may wear a sensor 14 configured to generate data indicative of his or her position. The sensor can be similar to the sensors 14 described above with respect to aircraft 12.

The processor of device 20 (or another device) may receive the sensor data from sensors 14 via any suitable means. For example, in some examples, the processor, or a device within which the processor is located, may receive the sensor data from sensors 14 via wireless communication using radio frequency (RF) telemetry techniques, any of a variety of local wireless communication techniques, such as RF communication according to the 802.11 or Bluetooth specification sets, infrared (IR) communication according to the IRDA specification set, very high frequency (VHF) data radios, Satellite Communications, Aircraft Communications and Reporting System (ACARS), or other standard or proprietary communication protocols. In some examples, the processor, or a device within which the processor is located, may also receive data or information from the sensors 14 via any suitable wired connection. The processor, or a device within which the processor is located, may also be configured to receive data or information from the sensors 14 via a satellite or air-to-ground communication technique.

Figure 2:
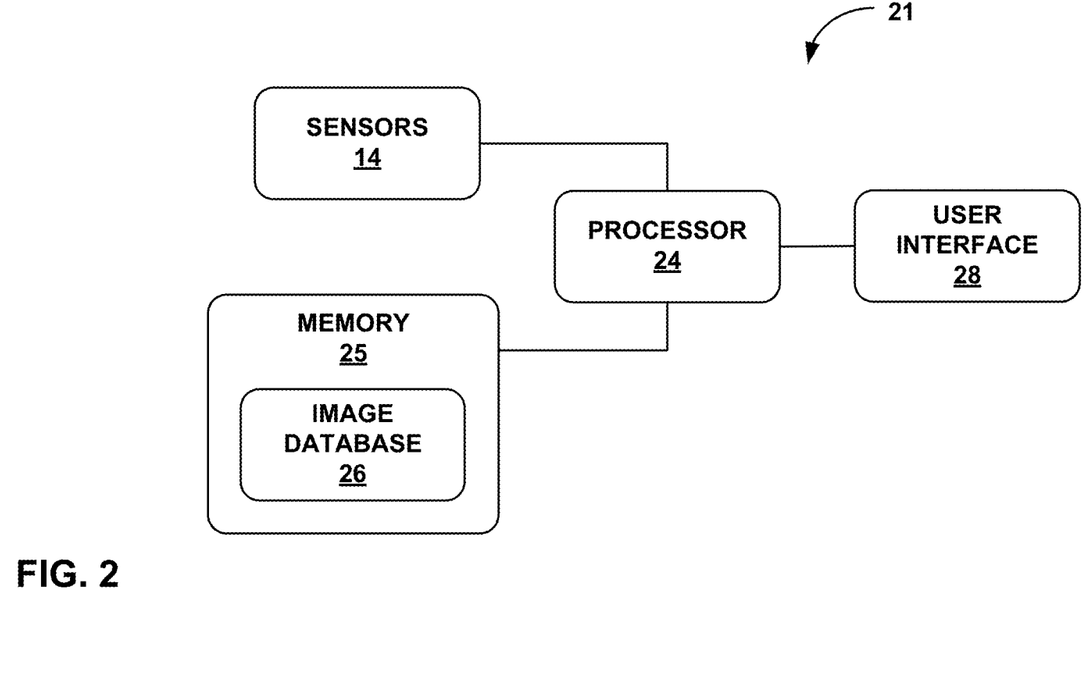
FIG. 2 is a schematic block diagram of an example system configured to generate and display a graphical user interface including an overhead image of a surface on which an aircraft is positioned, as well as graphical a representation of the aircraft and a graphical representation of at least one obstacle displayed together with the overhead image.

FIG. 2 is a schematic block diagram illustrating an example collision avoidance system 21 configured to generate and present a GUI including graphical representations of one or more detected obstacle 16 and a graphical representation of aircraft 12 together with an overhead image of surface 22 on which aircraft 12 is positioned. As illustrated in FIG. 2, example system 21 may include one or more sensors 14, processor 24, memory 25 including image database 26, and user interface 48.

Processor 24, as well as other processors disclosed herein, can comprise any suitable arrangement of hardware, software, firmware, or any combination thereof, to perform the techniques attributed to processor 24 herein. For example, processor 24 may include any one or more microprocessors, digital signal processors (DSPs), application specific integrated circuits (ASICs), field programmable gate arrays (FPGAs), or any other equivalent integrated or discrete logic circuitry, as well as any combinations of such components. Memory 25 includes any volatile or non-volatile media, such as a random access memory (RAM), read only memory (ROM), non-volatile RAM (NVRAM), electrically erasable programmable ROM (EEPROM), flash memory, and the like. Memory 25 may store computer readable instructions that, when executed by processor 24, cause processor 24 to perform the techniques attributed to processor 24 herein.

Processor 24 is configured to receive information indicative of obstacles proximate aircraft 12. Processor can receive the information via over a wired or wireless data channel via a communications system (not shown in FIG. 2). Processor 24 may be configured to send, receive, or both send and receive data from data sources onboard. aircraft 12 (e.g., sensors 14) as well as data sources external to aircraft 12, such as from other vehicles and ground-based systems. Example information that processor 24 can receive from sources external to aircraft 12 include, but are not limited to, data indicating the position and, in some cases, the velocity, of other aircraft on the ground, such as automatic dependent surveillance-broadcast or broadcast/traffic information service-broadcast (ADS-B/TIS-B) data received from other aircraft or ground vehicles, data transmitted by an airport or airline and indicating the position of other vehicles/aircraft/ obstacles (e.g., received by aircraft 12 via a Worldwide Interoperability for Microwave Access (WiMAX)), or any combination thereof.

The data received by processor 24 can include, for example, ADS-B data can provide information regarding not only the relative location of another aircraft, but also aircraft type data. In some examples, memory 24 or another memory (e.g., onboard aircraft 12 or external to aircraft) stores a database that provides geometry for different types of aircraft Thus, in some examples, based on ADS-B data received by processor 24, processor 24 can determine the size of a detected obstacle relative to aircraft 12.

As discussed above with respect to FIG. 1, one or more sensors 14 may be configured to generate sensor data indicative of a position of a portion of aircraft 12 (e.g., the portion of aircraft 12 upon which a respective sensor 14 is positioned), and processor 24 can be configured to receive the information and determine the location of aircraft 12 based on the received information.

In addition, one or more sensors 14 may be configured to generate sensor data indicative of a position of at least one of obstacles 16, and processor 24 can be configured to receive the information and detect obstacles 16 and determine the location of obstacles 16 based on the received information. Processor 24 can, for example, detect an obstacle and determines the location of an obstacle proximate aircraft 12 using any suitable technique, such as, but not limited to, any one or more of the techniques described above, such as those described in U.S. Patent Application Publication No. 2012/0200433 by Glover et al., U.S. patent application Ser. No. 12/835,122 by Lamkin et al., and U.S. patent application Ser. No. 13/710,400 by Bateman et al. Processor 24 can determine the location of the detected obstacle by, for example, determining the distance between the obstacle (or at least one surface of the obstacle) and aircraft 12 based on the radar return pulses, determining global coordinates of the obstacle based on information from one or more sensors 14.

In addition, processor 24 can be configured to determine not only the distance in one direction relative to aircraft (e.g., in the direction of the heading of aircraft 12), but also the angular position of the detected obstacle relative to a structure of aircraft 12 (e.g., the structure on which the sensor with which processor 24 detected the obstacle is positioned). Thus, in some examples, processor 24 is configured to determine a location of a detected obstacle based on a radial coordinate system, which may be determined relative to one or more fixed points on aircraft 12, which can be, for example, defined by the sensors with which processor 24 detects an obstacle. Processor 24 may, for example, implement techniques used by weather radar to determine the location of the detected obstacle.

In some examples, processor 24 determines a threat level of a detected obstacle, e.g., based on the proximity to aircraft 12 (e.g., determined based on the lateral distance between the detected obstacle and aircraft 12, based on a height of the detected obstacle, or both), based on the heading of aircraft 12, based on a speed of aircraft 12 or any combination thereof. The characterization of a detected obstacle as one of these types of targets may indicate a threat level of the detected obstacle, e.g., as a function of the possibility aircraft 12 will collide with the detected obstacle. In some examples, processor 24 determines a distance between aircraft 12 (e.g., a specific aircraft structure, such as a wing, wingtip or nacelle) and the detected obstacle (e.g., a direction in a direction parallel to the ground), and determines the threat level of the detected obstacle based on the determined distance.

In other examples, in addition to, or instead of, distance to aircraft 12, processor 24 can use one or more other criteria to determine the threat level of a detected obstacle. For example, in some examples, processor 24 determines a vertical height of a detected obstacle and characterizes determines the threat level of a detected obstacle based on the determined height of the detected obstacle, alone or in combination with the distance of the obstacle to aircraft 12. The vertical dimension is a direction substantially perpendicular to the aircraft heading and extends generally perpendicular to the ground.

The vertical height of a detected obstacle may indicate the threat level of the detected obstacle. If, for example, the detected obstacle is aligned with a wing of aircraft 12, but the height of the detected obstacle is lower than the height of the wing, processor 24 may characterize the detected obstacle as a relatively low threat level, even if the distance between the obstacle and aircraft 12 indicates the obstacle should be a higher threat level, because the possibility of the wing colliding with the obstacle is relatively low due to the height of the obstacle.

Memory 25 of system 21 another memory can store the parameters (e.g., vertical heights and lateral distances) with which processor 24 determines a threat level of a detected obstacle.

One or more sensors 14 may also be configured to generate sensor data indicative of a position of user 18, and processor 24 can be configured to receive the information and determine the location of user 18 based on the received information. Processor 24 can, for example, use any of the techniques described above for determining a location of obstacles 16 to determine the location of user 18. In some examples, processor 24 determines the location of user 18 based on global coordinates provided by a GPS sensor co-located with user 18 (e.g., in device 20 or on the user's person).

The information received by processor 24 from sensors 14 and other sources of information regarding the location of obstacles 16 may be stored in memory 24 in some examples.

As illustrated in FIG. 2, memory 25 includes image database 26, which may be configured to store overhead images of one or more surfaces, including surface 22 upon which aircraft 12 and obstacles 16 are positioned. The overhead images can be, for example, satellite images. Processor 24 may be configured to retrieve one or more overhead images from image database 26 in order to generate the GUI including graphical representations of aircraft 12 and one or more obstacles 16 on an overhead image of surface 22. Processor 24 may subsequently display the GUI via user interface 48.

In addition to, or instead of memory 25 located within device 20, in some examples, image database 26 can be stored by a device external to device and accessible to processor 24 via a suitable communication link. For example, image database 26 can be a satellite database provided by a third party. Examples of satellite databases can include, for example, Google Earth, provided by Google Inc. of Mountain View, Calif.

User interface 48 is configured to present information regarding one or more detected obstacles to a user, who may be a part of a crew in a cockpit of aircraft 12, a part of a ground crew, or another user. As discussed below, the information may be a GUI including a graphical representation of aircraft 12, graphical representations of one or more obstacles, and an overhead image of surface 22 on which aircraft 12 and the obstacles are positioned. User interface 48 includes a display, which can be, for example, one or more of a liquid crystal display (LCD) or a light emitting diode (LED) display configured to present visual information to the user. The display can be provided by any suitable device, such as, for example, one or more of a tablet computing device, an electronic flight bag (EFB), a primary flight display (PFD), a multifunction display (MFD), a navigation display, or any other suitable display. The display can be a head-up display, ahead-down display, or a head-mounted display.

In addition, in some examples, user interface 48 includes a speaker configured to deliver audible information, a sensory device configured to deliver information via a somatosensory alert, or any combination thereof. In some examples, user interface 48 is configured to receive input from a user. For example, user interface 48 can include one or more of a keypad, buttons, a peripheral pointing device or another input mechanism that allows the user to provide input and navigate though the user interface of device 20. The buttons may be dedicated to performing a certain function, e.g., receiving user input indicative of a specific type of input, or the buttons and the keypad may be soft keys that change in function depending upon the section of a display currently viewed by the user. In some examples, the display of user interface 48 may be a touch screen display configured to receive the input from a user.

Processor 24 is configured to generate and display, via user interface 48, a GUI that includes an overhead image (e.g., a satellite image) of surface 22 on which aircraft 12 is positioned, a graphical representation of aircraft 12, and graphical representations of obstacles 16. In some examples, the GUI also includes a graphical representation of a user. Processor 24 is configured to generate the GUI based on sensor data from one or more of sensors 14 and one or more overhead images from image database 26. The images may be satellite images of surface 22 upon which aircraft 12, obstacles 16, and user 18 are positioned.

In some examples, system 21 includes a rendering engine that is configured to display satellite data, terrain elevation data, and geo-registered image data in a global coordinate system (e.g., latitude and longitude). System 21 may store a collection of top down architectural plan images of an airport in memory 25 or the images may be stored external to system 21, e.g., in a remote database. Processor 24 can georegister the top down architectural plan images for display via the GUI by at least geo-registering the coordinates (e.g., latitude and longitude) of at least two corners of the image (e.g., the bottom left and top right corners of the images). Processor 24 can use these at least two points along with the image resolution and size to accurately display these now geo-registered images on the user interface top down view. This technique may also be used to georegister other types of images, such as satellite images.

Processor 24 positions the graphical representations of aircraft 12, obstacles 16, and user 18 relative to the overhead image to indicate the current position (e.g., geographical location and orientation) of aircraft relative to other features shown in the overhead image (e.g., airport buildings). In some examples, the overhead image includes an image of one or more of aircraft 12, obstacles, or user 18 in their respective positions at the time processor 24 generates the GUI. In these examples, processor 24 may still generate and represent the graphical representations of aircraft 12, obstacles 16, and user 18 in conjunction with the overhead image. Processor 24 may, for example, overlay the respective graphical representations over the images of aircraft 12, obstacles 16, and/or user 18. The graphical representations may, for example, be more easily distinguishable from other portions of the overhead image, which may help user 18 to quickly ascertain the position of aircraft 12, aircraft 12, obstacles 16, and user 18 in the GUI.

In addition, processor 24 can include additional graphical representations of one or more of aircraft 12, obstacles 16, and user 18 in the GUI to convey additional information to the user, such as the threat level of the obstacles. The graphical representations of obstacles 16 may, for example, include one or more characteristics (e.g., visible indicia) that indicate the threat level of the obstacles, which may be a function of the proximity of the obstacles to the vehicle. For example, for the graphical representation of one or more obstacle 16, processor 24 can select visible indicia (e.g., a particular color, shading, line pattern, or any combination thereof) from a plurality of available visible indicia based on the relative distance (e.g., lateral or vertical) between the detected obstacle and aircraft 12. Processor 24 may then generate and present the GUI including the graphical representation of the obstacle and the indication of the area of unknown including the visible indicia.

The plurality of available visible indicia can be, for example, organized according to a particular code in which a first indicia represents a first distance range to aircraft 12, a second indicia represents a second distance range to aircraft 12, and a third indicia represents a third distance range to aircraft 12. Any suitable number of distance ranges can be included in the code. As another example, the plurality of available visible indicia can be, for example, organized according to a code in which a first indicia represents a primary target, a second indicia represents an intermediate target, and a third indicia represents a secondary target. User 18 may be educated in the represented types of targets and the associated threat levels.

The graphical representations of aircraft 12, obstacles 16, and user 18 can take any suitable form. In some examples, the graphical representations of one or more of aircraft 12, obstacles 16, and user 18 are graphical icons that resemble the real world configurations of aircraft 12, obstacles 16, and user 18, respectively. In other examples, the graphical representations of one or more of aircraft 12, obstacles 16, and user 18 are graphical icons are general shapes (e.g., circles, parallelograms, triangles, and the like).

Processor 24 can generate the GUI in any suitable manner. Processor 24 generates the GUI by at least spatially registering the graphical representations of aircraft 12 and obstacles 16 to align with the overhead image in order to represent the real world position of aircraft 12 and obstacles 16 relative to each other, to user 18, and other features shown in the overhead image (e.g., building structure, geographical landmarks, and the like), In this way, the GUI includes an arrangement of graphical representations of aircraft 12. and obstacles 16, and, in some examples, user 18, on the overhead image that indicate the real world locations of aircraft 12 and obstacles 16 (and, in some examples, user 18). The registration can be performed, for example, based on coordinates of aircraft 12, coordinates of obstacles 16, and coordinates of one or more features of the overhead linage, The coordinates can be global coordinates or another suitable coordinate system.

Processor 24 may, in some examples, position the graphical representations of aircraft 12 and obstacles 16 (and, in some examples, user 18) relative to the overhead image (also referred to herein as "on" the overhead image or "overlaid" over the overhead image) by at least by geo-registering each of the graphical representations to particular portions of the overhead image. Processor 24 can, for example, determine the global coordinates of a plurality of different portions of aircraft 12 (e.g., based on the position indicated by a sensor 14 on the particular portion of aircraft 12), associate each of these global coordinates to respective portions of the graphical representation of aircraft 12, determine global coordinates of two or more reference points (e.g., building structures and landmarks, geographical features, and the like) in the overhead image or a coordinate system of the overhead image, and map the graphical representations of aircraft 12 to the overhead image by matching up the global coordinates of the plurality of different portions of aircraft 12 to the overhead image. Processor 24 can, for example, rotate a graphical representation of aircraft 12 relative to an overhead image until the global coordinates of two or more portions of aircraft 12 (e.g., at least three portions of aircraft 12) align with the portions of the overhead image corresponding to the global coordinates.

As another example, processor 24 can position the graphical representations of obstacles 16 relative to the overhead image by at least determining the global coordinates of each of obstacles 16 (e.g., a single point of each obstacle or multiple points on each obstacle), associate each of these global coordinates to the respective graphical representations of obstacles, determine global coordinates of two or more reference points (e.g., building structures and landmarks, geographical features, and the like) in the overhead image or a coordinate system of the overhead image, and map the graphical representation of the obstacles to the overhead image by matching up the global coordinates associated with the obstacles to the overhead image.

In other examples, processor 24 can position the graphical representations of obstacles 16 relative to the overhead image based on determined positions of the obstacles 16 relative to aircraft 12 (e.g., based on the distance and angular position between the obstacles and sensors 14 of aircraft 12). For example, processor 24 may position the graphical representation of aircraft 12 relative to the overhead image (e.g., using the technique described above), determining the relative position of the obstacles relative to one or more sensors 14 of aircraft 12, and positioning the graphical representations of obstacles 16 relative to the graphical representation of aircraft 12 based on the determined relative position of the obstacles relative to the one or more sensors 14 of aircraft 12.

In some examples, in order to generate the GUI including the graphical representation of aircraft 12 on the overhead image, processor 24 may geo-register graphical representations of a plurality of portions of aircraft 12 to a corresponding plurality of portions of the overhead image. For example, processor 24 may receive sensor data from a particular sensor 14 (e.g., sensor 14A) and, based on the data, geo-register a graphical representation of a portion of aircraft 12 corresponding to the particular sensor (e.g., left wing of aircraft 12) to a portion of the overhead image. Processor 24 may repeat this technique for a plurality of portions of aircraft 12, such that a graphical representation of the entirety of aircraft 12 may be accurately displayed over the overhead image.

In some examples, raw data from sensors 14 that indicates the location of a respective sensor 14 (and, thus, of the portion of aircraft 12 on which the respective sensor 14 is positioned) may include sensor drift or error and, thus, may not accurately represent the location. Thus, in some examples, processor 24 may utilize a technique such as sensor fusion to determine the location (e.g., global coordinates) of each sensor 14 and correct for any errors in the outputs of sensors 14. Processor 24 may perform the sensor fusion by referencing the location of each sensor 14 to the location of other sensors 14. Processor 24 may, for example, determine the relative positions between sensors 14 based on data stored by memory 25. Sensors 14 may be in fixed positions relative to each other, such that the relative positions (e.g., distances) between sensors 14 are known values that may not significantly over time. In some examples, processor 24 uses a limited fusion based sensor calibration procedure to determine the relative locations of sensors 14 to aircraft 12.

Figure 3:
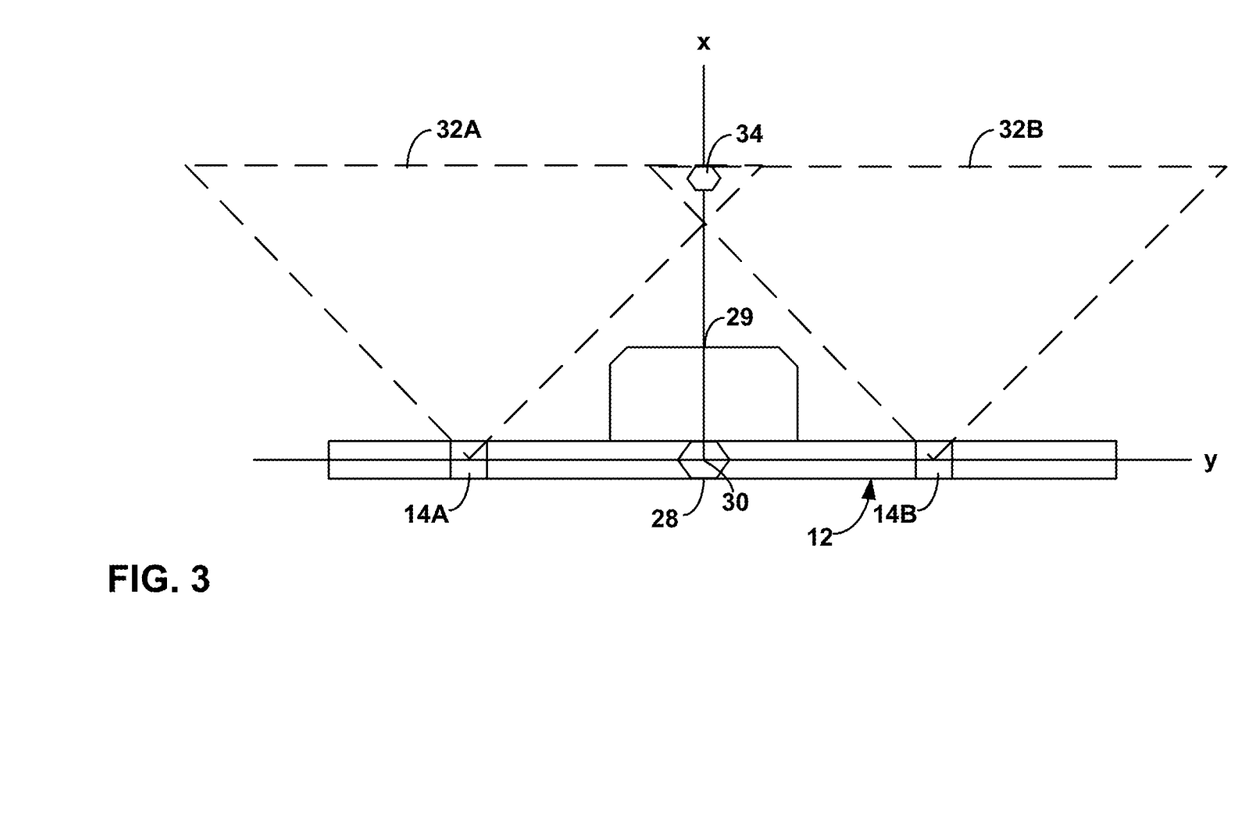
FIG. 3 is a conceptual diagram illustrating an example sensor fusion process.

FIG. 3 is a conceptual diagram illustrating an example of a limited fusion based sensor calibration procedure that processor 24 may implement in order to determine the relative positions of sensors 14 and to help account for sensor drift when using the output of sensors 14 to determine the location of sensors 14 in the real world. FIG. 3 illustrates a schematic front view of aircraft 12, which includes aircraft navigation receiver 28 and nose 29. Centerline 30 of aircraft 12 extends in a z-axis direction (orthogonal x-y axes are shown in FIG. 3 for ease of description only) through aircraft navigation receiver 28 and in a direction perpendicular to the plane of the image shown in FIG. 3. Also shown in FIG. 3 are two sensors 14A, 14B, which are located on respective wings of aircraft 12 and in a fixed position relative to each other. Sensors 14A, 14B each have a respective field of view 32A, 32B, which can be any suitable size.

In the calibration procedure, calibration target 34 is placed at a z-axis position along centerline 30 of aircraft 12 at a known distance in the x-axis direction from the centerline. Thus, the real world position of target 34 is known. Processor 24 determines the position of calibration target 34 based on the output of sensor 14A. This may be referred to as a first sensor-relative position of target 34. In addition, processor 24 separately determines the position of calibration target 34 based on the output of sensor 14B. This may be referred to as a second sensor-relative position of target 34. Processor 24 may repeat this for any other sensors 14 that are being calibrated, In this way, processor 24 determines a plurality of sensor-relative positions of calibration target 34 based on the outputs of a plurality of sensors 14.

Processor 24 can then determine the offsets of each sensor 14 (e.g. the offsets in a longitudinal direction, latitudinal direction, or both) by comparing the differences between the known position of target 24 and the sensor-relative position of target 14. The sensors offsets can indicate, for example, the relative location of a particular sensor relative to aircraft centerline 30, relative to another sensor 14, relative to another fixed point on aircraft, such as aircraft navigation receiver 28, or both. As another example, the sensor offsets can indicate the adjustment that needs to be made to the output of a particular sensor 14 to account for the errors in the output of the sensor. For example, processor 24 can determine that the sensor offset for sensor 14A is the difference between the first sensor-relative position of target 34 and the known real world location of target 34, Processor 24 may then adjust the output of sensor 14A by the offset in order to determine the real world position of sensor 14A based on the output of sensor 14A.

Processor 24 can perform the calibration of sensors 14 any suitable frequency, such as upon installation of system 21 on an aircraft, at periodic maintenance intervals (e.g., on a weekly or monthly basis), or both. Processor 24 can store the sensor offsets and relative positions of sensors 14 in memory 25 for later use by processor 24 for, e.g., sensor fusion. The calibration described with respect to FIG. 3 may allow for non-precision installation of sensors 14 because processor 24 can calibrate out relatively small errors and aircraft specific differences in the spacing of sensors 14.

Processor 24 may use sensor fusion to adjust for any errors in the location of sensors 14 indicated by sensors 14 themselves based on the known relative positions between sensors 14. As an example, processor 24 can adjust the outputs of sensors 14A, 14B using sensors offsets determined using the technique described with respect to FIG. 3. In addition, or in the alternative, processor 24 can adjust for errors in the location of sensors 14 based on the known positions of sensors 14. For example, if sensor 14A and 14B are known to be a fixed distance X from each other in a certain direction (e.g., along the y-axis direction shown in FIG. 3), but the output from sensors 14A, 14B indicates sensors 14A, 14B are a greater distance Y from each other, processor 24 may adjust the output from sensors 14A, 14B based on the distance between X and Y, such that the adjusted output from sensors 14A, 14B more accurately reflects the known distance between sensors 14A, 14B.

Processor 24 can implement any suitable sensor fusion technique to combine data from sensors 14 to better reflect the real world locations of sensors 14. By using sensors fusion and cross-referencing the outputs of sensors 14, processor 24 may generate data that more accurately indicates the position (e.g., global coordinates) of particular sensors 14 (and, thus, particular portions of aircraft 12). In some examples, instead of using the raw data directly received from sensors 14 to generate and overlay graphical representations of aircraft 12 and/or one or more obstacles 16 on the overhead image of surface 22, processor 24 may first manipulate or process the data, e.g., via sensor fusion, to arrive at data that is more accurately representative of the positions of particular portions of aircraft 12, particular obstacles 16, or user 18.

In other examples, processor 24 can use one or more other techniques to register the graphical representations of aircraft 12 and obstacles 16 the overhead image.

Figure 4:
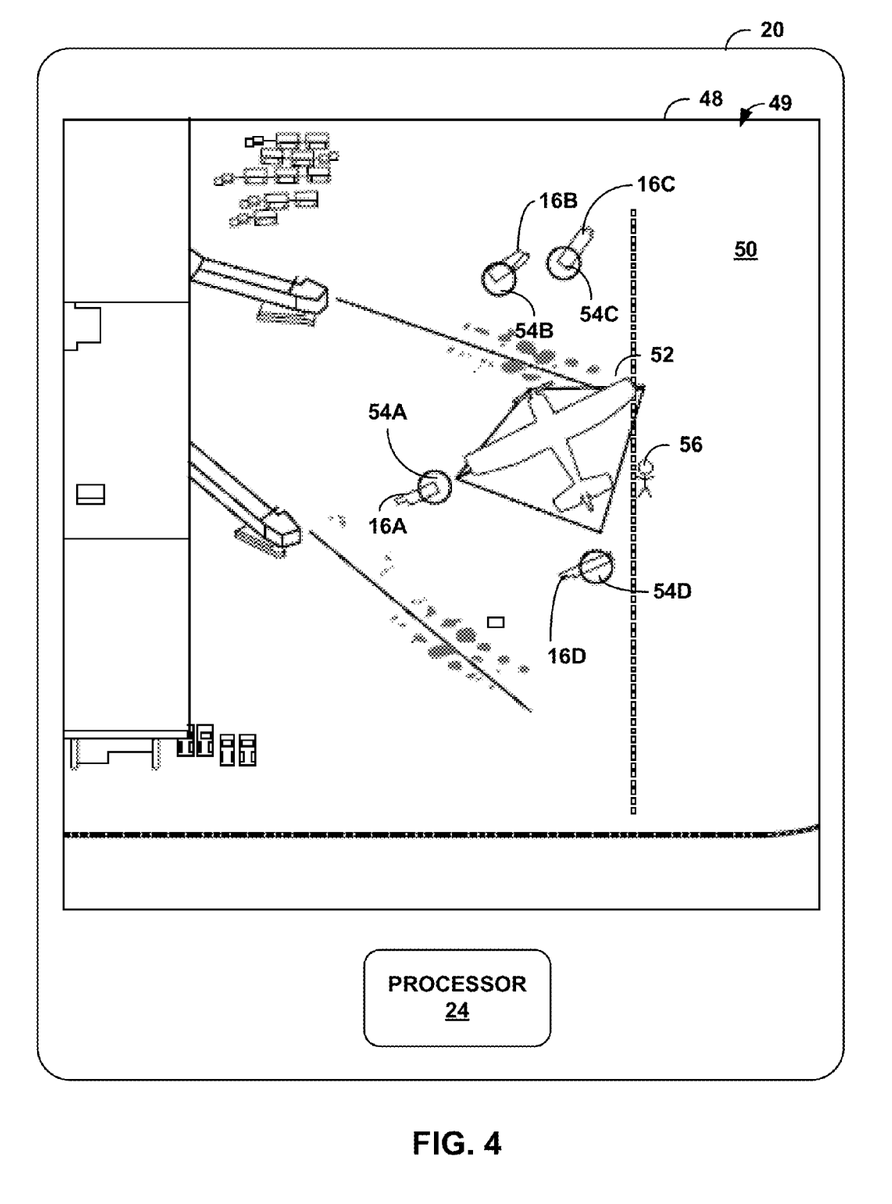
FIG. 4 is a schematic diagram of a device presenting an example graphical user interface including an overhead image of a surface on which an aircraft is positioned, as well as graphical a representation of the aircraft and a graphical representation of at least one obstacle displayed together with the overhead image.

FIG. 4 illustrates an example GUI 49, which is generated by processor 24. FIG. 4 schematically illustrates an example external device 20, which may be used by user 18 (e.g., aground crew member) to gain context awareness of aircraft 12 and obstacles 16. In the example illustrated in FIG. 4, device 20 includes processor 24 and user interface 48, which includes a display that is presenting GUI 49 generated by processor 24. GUI 49 includes satellite image 50 and graphical representation 52 of aircraft 12 and graphical representations 54A-54D of obstacles 16A-16D, respectively, on satellite image 50. Satellite image 50 is an example of an overhead image of surface 22 upon which aircraft 12 and obstacles 16 are positioned.

In the example illustrated in FIG. 4, GUI 49 also includes graphical representation 56 of user 18 on satellite image 50. In some examples, GUI 49 may also include a visible indicia that highlights or flags, for user 18 viewing GUI 49, the current location of the user. For example, a textual indication that "YOU ARE HERE" may be displayed adjacent graphical representation 56 of user 18. As another example, graphical representation 56 of user 18 can be displayed in a unique color that causes graphical representation 56 to stand out. The visible indicia that helps highlight or flag the current position of user 18 within satellite image 50 may help give the user context for the displayed GUI 49, e.g., so that user 18 may orient himself or herself to the displayed GUI 49.

As discussed above, processor 24 may generate GUI 49 by registering the graphical representations of aircraft 12, obstacles 16, and user 18 to satellite image 50 based on data from sensors 14. In the example illustrated in FIG. 4, satellite image 50 includes images of obstacles 16A-16D, and processor 24 generates GUI 39 such that graphical representations 54A-54D are positioned over the top of the portion of satellite image 50 that illustrates the respective obstacle 16, In other examples, satellite image 50 may not illustrate images of obstacles 16 and graphical representations 54 may be the only representation of obstacles 16 on satellite image 50. In either case, processor 24 may be configured to generate graphical representations 54 based on data from sensors 14.

Processor 24 generates graphical representations of obstacles 54A-54D to highlight the positions of the real world obstacles 16A-16D, e.g., to make them more visible or to make their positions known to user 18. In some examples, the graphical representations of aircraft 12 are selected based on a unique code transmitted to the display device across digital messages. This code can be selected when system 21 is installed on aircraft 12 and the aircraft type and model are identified. The code is transmitted via digital message to processor 14, which then selects, based on the code, the correct aircraft footprint from a library of available footprints (e.g., stored by memory 25). These footprints can be updated throughout the life of system 21 to keep pace with new models of aircraft.

In some examples, processor 24 can choose obstacle representations according to several conditions. As part of the transmission of anti-collision data from aircraft 12 to a ground user, processor 24 may transmit many targets which may represent the same obstacle or multiple obstacles. Processor 24 or a device used by the ground user may attempt to piece together targets that make up a single large obstacle versus targets that represent many discrete obstacles in the area. For targets that processor 24 can reasonably conclude are part of the same obstacle, processor 24 may generate a GUI including a dynamically sized graphical representation of the obstacle. For targets that represent small discrete obstacles, processor 24 may generate a GUI including a relatively small default graphical representation of the obstacle.

Graphical representations 54A-54D may have any configuration suitable for illustrating the position of obstacles 16A-16D, and, in some cases, the threat level of the obstacles, to user 18. For example, graphical representations 54A-54D may be any suitable shape (e.g., a circle, a square, a shape that approximates the actual obstacle 16 etc.), color (e.g., a bright color to attract attention to the graphical representation, a variety or pattern of colors, etc.), and the like. In addition, in some examples, GUI 49 includes one or more characteristics (e.g., visible indicia) that indicate a relative distance between obstacles 16 and the aircraft 12 in the real world.

Similarly, processor 24 generates graphical representation 52 to highlight the position of aircraft 12, e.g., relative to obstacles 16, user 18, or other objects (e.g., that appear in satellite image 50). Graphical representation 52 may have any configuration suitable for illustrating the position of one or more portions of aircraft 12 to user 18. For example, graphical representation 52 may have a configuration similar to an aircraft shape, or may be a different shape. In some examples, memory 25 (FIG. 2) of system 21 stores a plurality of graphical representations 52 of aircraft 12, and processor 24 selects the graphical indication 52 based on a determined type of aircraft 12. Processor 24 can determine the type of aircraft based on, for example, user input received via user interface 48 (FIG. 2) or based on data received from aircraft 12 or ground control. Each graphical representation 52 of aircraft 12 can, for example, have a configuration that represents the real-world configuration (e.g., a top plan view) of aircraft 12. In other examples, graphical representation 52 of aircraft 12 is a generic shape that is used for multiple types of aircraft 12.

GUI 49 presents information that indicates the real world position of obstacles 16 relative to aircraft 12, as well as relative to user 18. GUI 49 provides information with which user 18, who may in some examples be a ground crew member, may gain awareness of the relative positions of various portions of aircraft 12 and obstacles 16 and, thus, be able to more effectively direct maneuvering of aircraft 12 around obstacles 16.

Although not shown in FIG. 4, in some examples, processor 24 generates GUI 49 including additional information regarding one or more of aircraft 12 and obstacles 16. For example, GUI 49 can provide one or more of alphanumeric information that indicates the length, width, and type of aircraft 12 being displayed, the GPS position of one or more sensors 14, the aircraft-centered positions of sensors 14, and a list of detected obstacles (e.g., the position, such as distance an angular position, relative to a particular sensor 14). Processor 49 can update GUI 49 to include this information periodically, upon receipt of user input requesting the information, or at any other suitable time.

An aircraft-centered position of a sensor 14 is the position of sensor 14 in the coordinate system of aircraft 12, which is, tier example, fixed relative to a known, fixed point on aircraft. In some examples, the known, fixed point about which the aircraft coordinate system is generated is the aircraft navigation receiver, which may be point (0,0) of the coordinate system. Processor 24 may need to determine the position of sensors 14 in the aircraft coordinate system in order to correctly display obstacle positions in the correct locations in GUI 49. Processor 24 may determine the position of sensors 14 in the aircraft coordinate system based on the location of a particular sensor relative to fixed point on aircraft 12, such as aircraft navigation receiver 28, adjusted by the sensor offset (described with respect to FIG. 3).

Figure 5:
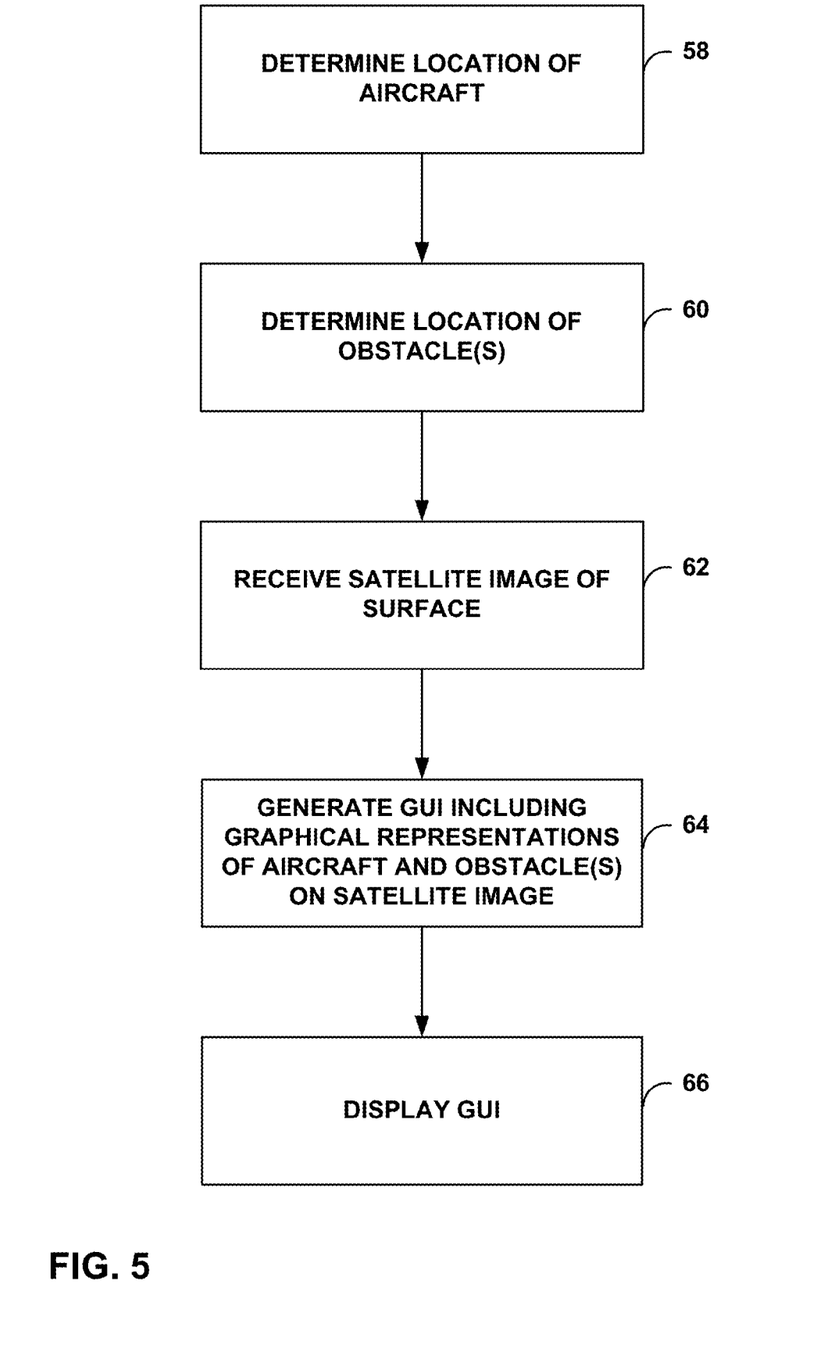
FIG. 5 is a flow diagram illustrating a technique for generating a graphical user interface including an overhead image of an area in which an aircraft is positioned, as well as graphical representation of the aircraft and a graphical representation of at least one obstacle displayed together with the overhead image.

FIG. 5 is a flow diagram illustrating an example technique for generating a GUI including an overhead image of an area in which aircraft 12 is positioned (e.g., a surface on which aircraft 12 is positioned), as well as graphical representation of aircraft 12 and a graphical representation of at least one obstacle 16 displayed together with the overhead image. While FIG. 5 is primarily described with respect to GUI 49 (FIG. 4), in other examples, the technique shown in FIG. 5 can be used to generate another GUI including the graphical representations of aircraft 12 and one or more obstacles 16 on an overhead image of an area in which aircraft 12 is positioned. In addition, while the technique shown in FIG. 5, is primarily described with respect to processor 24 and system 21, in other examples, another processor can perform any part of the technique shown in FIG. 5, as well as any other techniques described herein, alone or in combination with processor 24.

In accordance with the technique shown in FIG. 5, processor 24 determines the location of aircraft 12 (58). For example, processor 24 may receive sensor data indicative of a position of a portion of aircraft 12, e.g., from one of sensors 14, For example, as discussed above, processor 24 may receives sensor data from sensor 14A that is indicative of a position of the left wing of aircraft 12, The determine location of aircraft 12 can include, for example, global coordinates of one or more portions of aircraft 12, or locations of one or more portions of aircraft 12 relative to known reference point (e.g., an airport structure).

According to the technique illustrated in FIG. 5, processor 24 determines the location of one or more obstacles (60). For example, processor 24 may receive sensor data indicative of a position of one or more obstacles 16, e.g., from one or more of sensors 14. Processor 24 can determine the location of the one or more obstacles using any suitable technique, such as, but not limited to, any one or more of the techniques described above, such as those described in U.S. Patent Application Publication No. 2012/0200433 by Glover et al., U.S. patent application Ser. No. 12/835,122 by Lamkin et al., and U.S. patent application Ser. No. 13/710,400 by Bateman et al. Processor 24 can determine the location of the one or more obstacles by, for example, determining the distance between each obstacle (or at least one surface of the obstacle) and aircraft 12 based on the radar return pulses, determining global coordinates of the obstacle based on information from sensors 14 or information received via another source.

Processor 24 may receive satellite image 50 (or another overhead image) of surface 22 upon which aircraft 12 and one or more obstacles 16 are positioned (62). In some examples, device 20 may store satellite image 50, e.g., in memory 25, and processor 24 may retrieve satellite image 50 from memory 25. In other examples, a remote computer or party may transmit satellite image 50 to processor 24.

Processor 24 may generate GUI 49 including graphical representation 52 of aircraft 12 and graphical representations 54A-54D of obstacles 16A-16D, respectively, on satellite image 50 (64) and display GUI 49 (66), e.g., via a display device of user interface 48. For example, processor 24 may generate GUI 49 so by geo-registering a. graphical representation of one or more portions of aircraft 12 and geo-registering graphical representation(s) of obstacle(s) 16 to satellite image 50, as discussed with respect to FIG. 5.

The techniques of this disclosure may be implemented in a wide variety of computer devices. Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a tangible computer-readable storage medium and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. in any such cases, the computers described herein may define a specific machine that is capable of executing the specific functions described herein. Also, the techniques could be fully implemented in one or more circuits or logic elements, which could also be considered a processor.

Various examples have been described. These and other examples are within the scope of the following claims.

What is claimed is:

1. A method comprising:
   determining, by a processor, a location of at least one obstacle proximate an aircraft;
   determining, by the processor, a location of the aircraft;
   generating, by the processor, a graphical user interface based on the location of the at least one obstacle and the location of the aircraft, the graphical user interface comprising a graphical representation of the aircraft and a graphical representation of the at least one obstacle overlaid on an overhead image of an area in which the aircraft and the at least one obstacle are positioned, wherein the overhead image is an image of a real-world environment in which the aircraft is positioned, and wherein generating the graphical user interface comprises spatially registering, by the processor, the graphical representation of the aircraft and the graphical representation of the at least one obstacle with the overhead image to indicate a position of the aircraft and the at least one obstacle relative to a feature shown in the overhead image; and
   displaying, by the processor, the graphical user interface via a display device on the aircraft or on a device external to the aircraft.

2. The method of claim 1, wherein determining the location of the at least one obstacle comprises receiving, by the processor, sensor data indicative of the location of the at least one obstacle, and wherein spatially registering the graphical representation of the aircraft and the graphical representation of the at least one obstacle with the overhead image comprises geo-registering the graphical representation of the at least one obstacle to a portion of the overhead image based on the sensor data.

3. The method of claim 2, wherein receiving sensor data indicative of the location of at least one obstacle comprises receiving at least one of Global Positioning System (GPS) sensor data, radar sensor data, or data from a camera.

4. The method of claim 1, wherein determining the location of the aircraft comprises receiving, by the processor, sensor data indicative of the location of the aircraft, and wherein spatially registering the graphical representation of the aircraft and the graphical representation of the at least one obstacle with the overhead image comprises geo-registering the graphical representation of the aircraft to a portion of the overhead image based on the sensor data indicative of the location of the portion of the aircraft.

5. The method of claim 4, wherein the sensor data indicates the location of each of a plurality of different portions of the aircraft, and wherein geo-registering the graphical representation of the aircraft to the portion of the overhead image comprises geo-registering each portion of the plurality of different portions of the aircraft to respective portions of the overhead image based on the sensor data.

6. The method of claim 4, wherein receiving sensor data indicative of the location the aircraft comprises receiving at least one of Global Positioning System (GPS) sensor data or an inertial navigation system of the aircraft.

7. The method of claim 1, wherein the overhead image comprises a satellite image.

8. The method of claim 1, further comprising receiving, by the processor, sensor data indicative of a location of a user, wherein generating the graphical user interface comprises generating, based on the sensor data, the graphical user interface comprising a graphical representation of the user on the overhead image.

9. The method of claim 1, further comprising:
   determining, by processor, a threat level of the at least one obstacle based on the location of the at least one obstacle; and
   generating, by the processor, the graphical representation of the at least one obstacle to include a characteristic that represents the determined threat level of the at least one of the at least one obstacle or the area of unknown.

10. The method of claim 1, wherein determining the location of the at least one obstacle comprises receiving, by the processor, sensor data indicative of the location of the at least one obstacle or the aircraft, wherein spatially registering the graphical representation of the aircraft and the graphical representation of the at least one obstacle with the overhead image comprises:
    determining global coordinates of at least a portion of the aircraft or the at least one obstacle based on the sensor data;
    determining global coordinates of two or more reference points in the overhead image or a coordinate system of the overhead image; and
    mapping the graphical representation of the aircraft or the graphical representation of the at least one obstacle to the overhead image by at least matching up the global coordinates of a respective one of the aircraft or the at least one obstacle to the overhead image based on the determined global coordinates of the two or more reference points in the overhead image or the coordinate system of the overhead image.

11. An aircraft system comprising:
a display; and
a processor configured to determine a location of at least one obstacle proximate an aircraft, determine a location of the aircraft, generate a graphical user interface based on the location of the at least one obstacle and the location of the aircraft, and display the graphical user interface via the display, the graphical user interface comprising a graphical representation of the aircraft and a graphical representation of the at least one obstacle overlaid on an overhead image of area in which the aircraft and the at least one obstacle are positioned, wherein the overhead image is an image of a real-world environment in which the aircraft is positioned, and wherein the processor is configured to generate the graphical user interface by at least spatially registering the graphical representation of the aircraft and the graphical representation of the at least one obstacle with the overhead image to indicate a position of the aircraft and the at least one obstacle relative to a feature shown in the overhead image.

12. The aircraft system of claim 11, further comprising at least one sensor configured to generate sensor data indicative of the location of the at least one obstacle, wherein the processor is configured to determine the location of the at least one obstacle based on the sensor data, and spatially register the graphical representation of the aircraft and the graphical representation of the at least one obstacle with the overhead image by at least geo-registering the graphical representation of the at least one obstacle to a portion of the overhead image based on the sensor data.

13. The aircraft system of claim 12, wherein e at least one sensor comprises at least one of a Global Positioning System (GPS) sensor, a radar sensor, or a camera.

14. The aircraft system of claim 11, further comprising at least one sensor configured to generate sensor data indicative of the location of the aircraft, and wherein the processor is configured to determine the location of the aircraft based on the sensor data, and spatially register the graphical representation of the aircraft and the graphical representation of the at least one obstacle with the overhead image by at least geo-registering the graphical representation of the aircraft to a portion of the overhead image based on the sensor data indicative of the location of the portion of the aircraft.

15. The aircraft system of claim 14, wherein the sensor data indicates the location of each of a plurality of different portions of the aircraft, and wherein the processor is configured to geo-register the graphical representation of the aircraft to the portion of the overhead image by at least geo-registering each portion of the plurality of different portions of the aircraft to respective portions of the overhead image based on the sensor data.

16. The aircraft system of claim 14, wherein the at least one sensor comprises at least one of Global Positioning System (GPS) sensor or an inertial navigation system of the aircraft.

17. The aircraft system of claim 11, further comprising at least one sensor configured to generate sensor data indicative of a location of a user, wherein the processor is configured to generate the graphical user interface by at least generating, based on the sensor data, the graphical user interface comprising a graphical representation of the user on the overhead image.

18. The aircraft system of claim 11, wherein the processor is further configured to determine a threat level of the at least one obstacle based on the location of the at least one obstacle, and generate the graphical representation of the at least one obstacle to include a characteristic that represents the determined threat level of the at least one of the at least one obstacle or the area of unknown.

19. The aircraft system of claim 11, wherein the processor is configured to determine the location of the at least one obstacle by at least receiving sensor data indicative of the location of the at least one obstacle or the aircraft, and wherein the processor is configured to spatially register the graphical representation of the aircraft and the graphical representation of the at least one obstacle with the overhead image by at least:
    determining global coordinates of at least a portion of the aircraft or the at least one obstacle based on the sensor data;
    determining global coordinates of two or more reference points in the overhead image or a coordinate system of the overhead image; and
    mapping the graphical representation of the aircraft or the graphical representation of the at least one obstacle to the overhead image by at least matching up the global coordinates of a respective one of the aircraft or the at least one obstacle to the overhead image based on the determined global coordinates of the two or more reference points in the overhead image or the coordinate system of the overhead image.

20. An aircraft system comprising:
means for determining a location of at least one obstacle proximate an aircraft;
means for determining a location of the aircraft;
means for receiving an overhead image of area in which the aircraft and the at least one obstacle are positioned;
means for generating a graphical user interface based on the location of the at least one obstacle and the location of the aircraft, the graphical user interface comprising a graphical representation of the aircraft and a graphical representation of the at least one obstacle on the overhead image, wherein the overhead image is an image of a real-world environment in which the aircraft is positioned, and wherein the means for generating the graphical user interface comprises means for spatially registering the graphical representation of the aircraft and the graphical representation of the at least one obstacle with the overhead image to indicate a position of the aircraft and the at least one obstacle relative to a feature shown in the overhead image.

* * * * *